(12) United States Patent  (10) Patent No.: US 8,334,671 B1
Mosiello  (45) Date of Patent: Dec. 18, 2012

(54) POWER SOURCE FOR PORTABLE CHARGERS

(76) Inventor: John Mosiello, Levittown, NY (US)

( * ) Notice: Subject to any disclaimer, the term of this patent is extended or adjusted under 35 U.S.C. 154(b) by 420 days.

(21) Appl. No.: 12/609,913

(22) Filed: Oct. 30, 2009

Related U.S. Application Data

(63) Continuation-in-part of application No. 29/332,870, filed on Feb. 26, 2009, now Pat. No. Des. 617,730.

(51) Int. Cl.
*H02J 7/00* (2006.01)
(52) U.S. Cl. ........................................ 320/107; 320/114
(58) Field of Classification Search .................. 320/105, 320/107, 114; 439/803; D13/120
See application file for complete search history.

(56) References Cited

U.S. PATENT DOCUMENTS

| | | | |
|---|---|---|---|
| D221,824 S | 9/1971 | Cook | |
| D259,954 S | 7/1981 | Reichl | |
| 5,963,013 A * | 10/1999 | Watson et al. | 320/107 |
| 6,104,099 A * | 8/2000 | Mizuta et al. | 307/9.1 |
| D433,992 S | 11/2000 | Luecke | |
| D490,434 S | 5/2004 | Meyer et al. | |
| 7,033,209 B2 * | 4/2006 | Swiatek et al. | 439/502 |
| D539,734 S | 4/2007 | Brady et al. | |
| 7,972,142 B2 * | 7/2011 | Swiatek et al. | 439/34 |
| 2004/0004067 A1 * | 1/2004 | Scaccia | 219/267 |
| 2006/0178028 A1 * | 8/2006 | Swiatek et al. | 439/215 |
| 2009/0091292 A1 * | 4/2009 | Nippear et al. | 320/107 |
| 2011/0286168 A1 * | 11/2011 | Scheucher | 361/679.01 |

* cited by examiner

*Primary Examiner* — Richard V Muralidar

(57) ABSTRACT

The present invention features a portable charger comprising a handle bar attachment means, a charger receptacle attached to the handle bar attachment means, a charging contact disposed within the charger receptacle for accepting a cigarette lighter charger head, wherein the cigarette lighter charger head is operatively connected to a first wire that can be plugged to an electronic device that needs battery recharge; and a set of power source wires operatively connecting the charging contact to a battery unit.

2 Claims, 4 Drawing Sheets

POWER SOURCE FOR PORTABLE CHARGERS

PRIORITY

The present application claims priority to design U.S. patent application Ser. No. 29/332,870, filed Feb. 26, 2009, the disclosure of which is incorporated in its entirety by reference herein.

BACKGROUND OF THE INVENTION

The present invention features a portable charger for personal electronic devices (e.g., cell phones). In particular, the portable charger of the present invention may be conveniently and temporarily attached to, for example, a part of a motorcycle such as a handle bar. Further, the portable charger can be removed from the handle bar at the user's discretion.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 shows a side view of a portable charger with the clamping components spread open for insertion of a handle bar in between.

DESCRIPTION OF PREFERRED EMBODIMENTS

Figure 1:
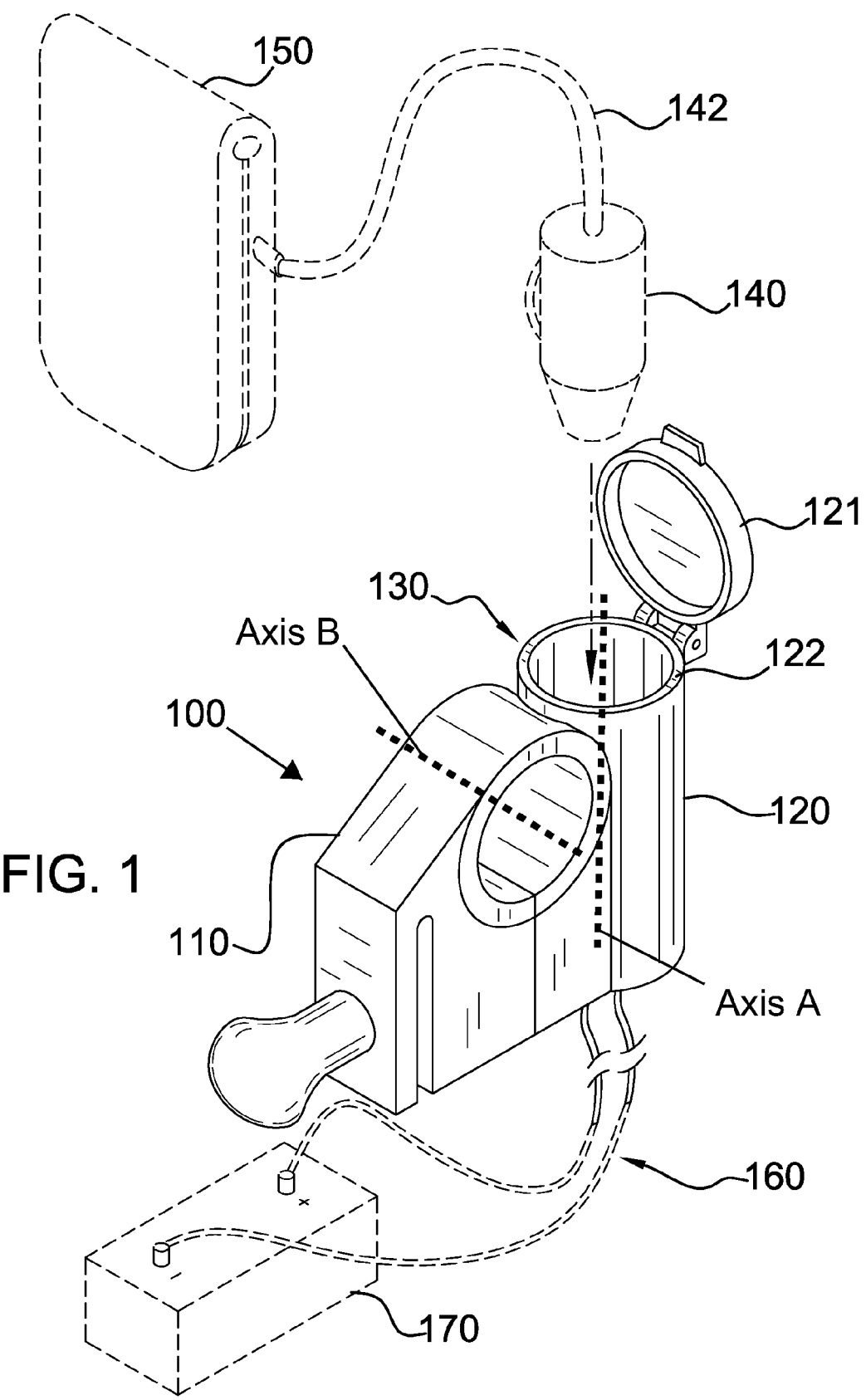
FIG. 1 shows a perspective view of a portable charger.

The present invention features a portable charger 100. In some embodiments, the portable charger 100 comprises a handle bar attachment means 110, a charger receptacle 120 attached to the handle bar attachment means 110, a charging contact 130 disposed within the charger receptacle for accepting a cigarette lighter charger head 140. The internal compartment of the charger receptacle 120 is appropriately sized to hold a standard cigarette lighter charger head 140 that is commonly used in the industry. The cigarette lighter charger head 140 is well known by one of ordinary skill. The charging contact 130 is appropriately disposed within the charger receptacle 120 to charge the cigarette lighter charger, as would be known by one of ordinary skill in the art. The cigarette lighter charger head 140 is operatively connected to a first wire 142 that can be plugged to an electronic device 150 that needs battery recharge. In some embodiments, a set of power source wires 160 operatively connects the charging contact to a battery unit 170. In some embodiments, the battery unit 170 may be a motorcycle battery.

Figure 2:
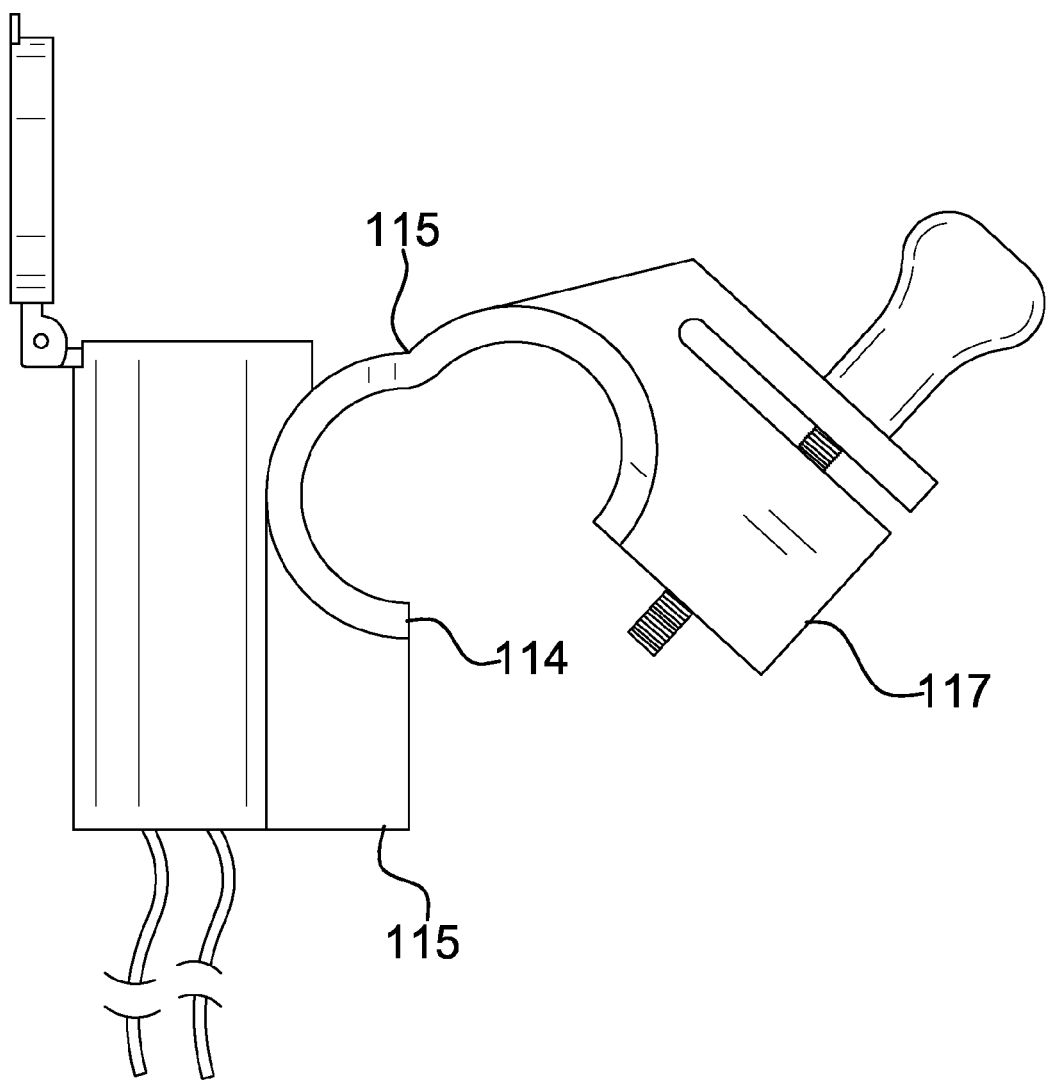
Figure 3:
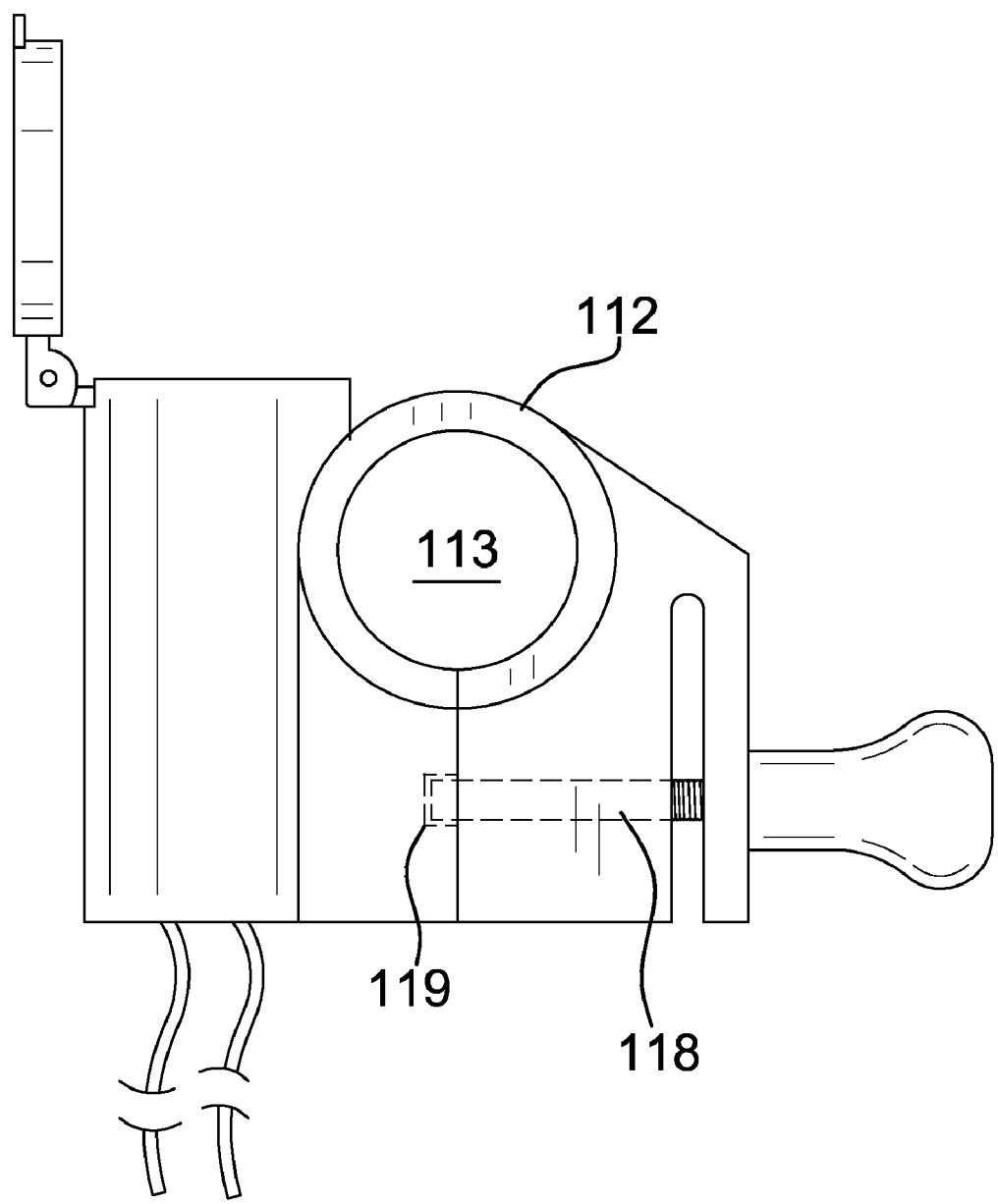
FIG. 3 shows a side view of a portable charger with the first and second clamping component secured together.

In some embodiments, the handle attachment means 110 comprises a first clamping component 115 and a second clamping component 117. In some embodiments, the first and second clamping components 115/117 can be separated temporarily for inserting a handle bar in between. In some embodiments, a screw 118 can be threaded through the second clamping component 117 and into a receiving nut 119 disposed in the first clamping component 115. The screw 118 can be used to tighten the first clamping component 115 to the second clamping component 117. When the first and second clamping components 115/117 are sealed together they can sandwich a handle bar in between. For example, FIG. 2 shows the attachment means with the first and second clamp 115/117 component spread open to allow an easy insert of a handle bar. After the handle bar is in place, the first and second clamp component 115/117 can be secured together, for example by a screw 118. When the first and second clamping components are secured together they can tightly clamp a handle bar in between. In some embodiments, the first and second clamping components are connected by a bendable joint 115.

In some embodiments, the first and second clamp components 115/117 form a hollow opening 113 for accommodating a handle bar therein. In some embodiments, the hollow opening 113 is lined with a rubber material 114. In some embodiments, the hollow opening is in a form of a ring structure. In some embodiments, the ring structure can snugly wrap around a handle bar of a motorcycle and secure it thereto.

In some embodiments, the receptacle 120 comprises a lid 121 pivotably hinged to a lip 122 of the charger receptable 120. When the lid 121 is in an open position a cigarette lighter charger head 140 can be inserted into the charger receptacle 120. When the lid 121 is in a closed position the internal portion of the charger receptacle 120 can be protected from outside elements.

Figure 4:
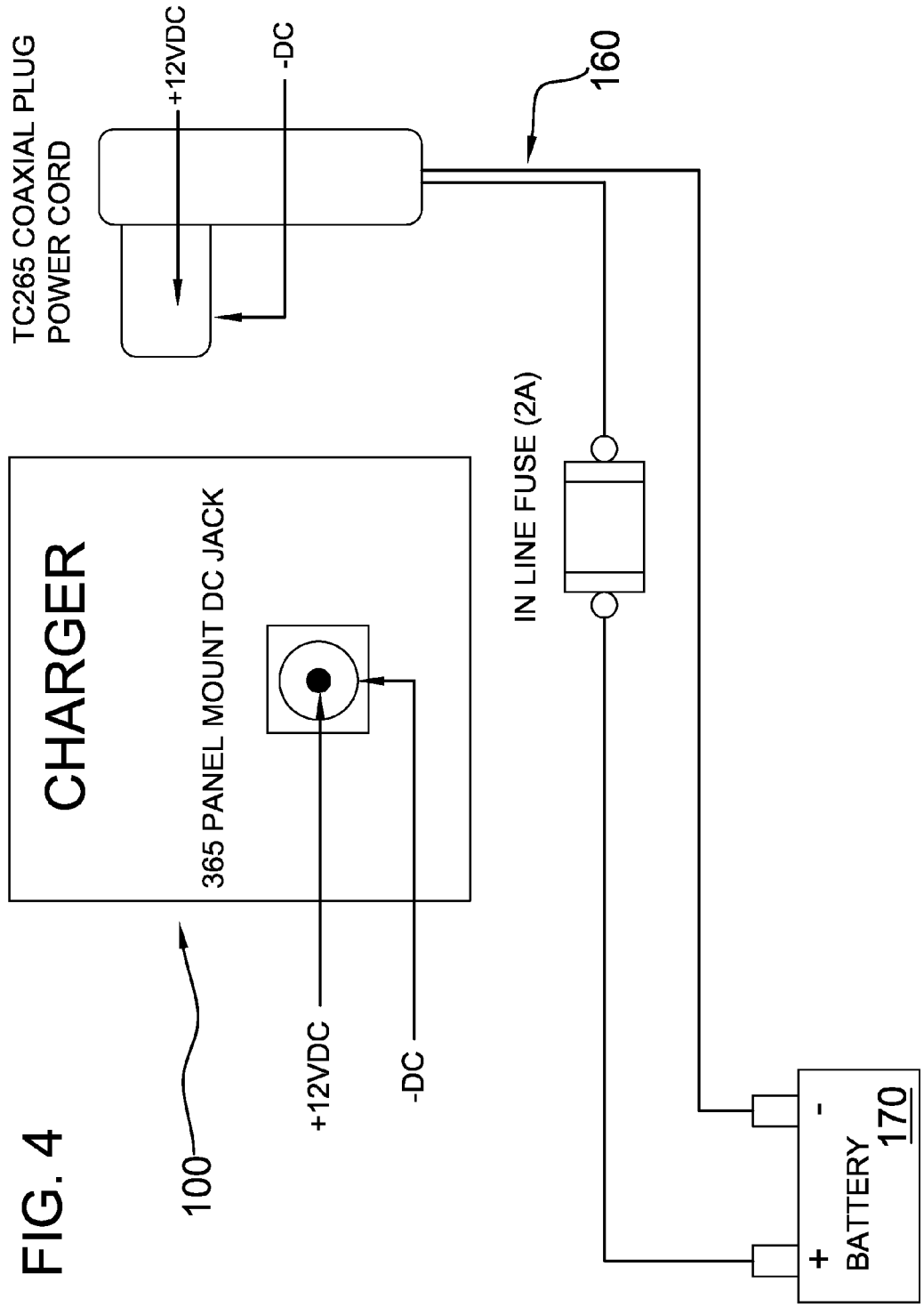
FIG. 4 shows a schematic diagram of a set of power source wire adapted to be detachable from the charger.

In some embodiments, the set of power source wire 160 is detachable from the portable charger. FIG. 4 shows a schematic diagram of the set of power source wires 160 adapted with a coaxial plug for plugging into a mount on the charger 100, wherein the mount is operatively connected to the electrical contact disposed within the receptacle.

Various modifications of the invention, in addition to those described herein, will be apparent to those skilled in the art from the foregoing description. Such modifications are also intended to fall within the scope of the appended claims. For example, the portable charger of the present invention can be used on a moped, ATV, scooters and the like.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A portable charger comprising:
   (a) a handle bar attachment means comprising a first clamping component and a second clamping component, wherein the first clamping component and the second clamping component can be separated temporarily via a bendable joint by moving to an open second position for inserting a cylindrical handle bar in between, wherein in a closed first position, the first clamping component and the second clamping component form a seamed cylindrical hollow opening for snuggly accommodating the cylindrical handle bar to secure the portable charger thereto, wherein a screw can be threaded through the second clamping component and into a receiving nut disposed in the first clamping component, wherein the screw is effective to tighten the first clamping component to the second clamping component, wherein the receiving nut is disposed opposite the bendable joint with respect to the hollow opening;

(b) a charger receptacle attached to the handle bar attachment means, wherein a longitudinal axis (Axis A) of an interior cylindrical wall of the charger receptacle is disposed perpendicularly to a longitudinal axis (Axis B) of the cylindrical wall of the hollow opening of the first clamping component and the second clamping component in the closed first position, wherein an axis of motion (Axis A) for inserting a cigarette lighter charger head into the charger receptacle is perpendicular to the longitudinal axis (Axis B) of the handle bar secured in the first clamping component and the second clamping component;

(c) a charging contact disposed within the charger receptacle for accepting a cigarette lighter charger head, wherein the cigarette lighter charger head is operatively connected to a first wire that can be plugged to an electronic device that needs battery recharge;

(d) a set of power source wires operatively connecting the charging contact to a battery unit.

2. The portable charger of claim 1 wherein the charger receptacle comprises a lid pivotably hinged to a lip of the charger receptacle, wherein when the lid is in an open position a cigarette lighter charger head can be inserted into the charger receptacle and when the lid is in a closed position an internal portion of the charger receptacle can be protected from outside elements.

* * * * *